US012654679B2

(12) United States Patent
Matsumoto

(10) Patent No.: US 12,654,679 B2
(45) Date of Patent: Jun. 16, 2026

(54) VEHICLE TRAVEL CONTROL DEVICE

(71) Applicant: SUBARU CORPORATION, Tokyo (JP)

(72) Inventor: Koki Matsumoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 144 days.

(21) Appl. No.: 18/380,269

(22) Filed: Oct. 16, 2023

(65) Prior Publication Data

US 2024/0132052 A1    Apr. 25, 2024
US 2024/0227779 A9    Jul. 11, 2024

(30) Foreign Application Priority Data

Oct. 25, 2022    (JP) ................................ 2022-170780

(51) Int. Cl.
   *B60W 30/02*      (2012.01)
   *B60W 30/14*      (2006.01)
   *B60W 30/182*     (2020.01)
   *B60W 50/14*      (2020.01)
(52) U.S. Cl.
   CPC .......... *B60W 30/02* (2013.01); *B60W 30/146* (2013.01); *B60W 30/182* (2013.01); *B60W 50/14* (2013.01); *B60W 2552/20* (2020.02)
(58) Field of Classification Search
   CPC .. B60W 30/02; B60W 30/146; B60W 30/182; B60W 50/14; B60W 2552/20
   USPC .......................................................... 701/93
   See application file for complete search history.

(56) References Cited

U.S. PATENT DOCUMENTS

| | | | | | |
|---|---|---|---|---|---|
| 5,593,217 | A | * | 1/1997 | Schmitt ................... | B60T 8/175 |
| | | | | | 188/1.11 R |
| 2015/0224989 | A1 | * | 8/2015 | Fairgrieve ............. | B60W 50/08 |
| | | | | | 701/41 |
| 2015/0239474 | A1 | * | 8/2015 | Nakamura ........... | B60L 3/0061 |
| | | | | | 180/170 |
| 2019/0187722 | A1 | | 6/2019 | Hu et al. | |
| 2023/0030288 | A1 | * | 2/2023 | Matsumoto ........... | B60K 35/28 |
| 2023/0125472 | A1 | * | 4/2023 | Jeong ............. | B60W 30/18172 |
| | | | | | 701/22 |

(Continued)

FOREIGN PATENT DOCUMENTS

JP      2019-106159 A    6/2019

*Primary Examiner* — Ramon A. Mercado
(74) *Attorney, Agent, or Firm* — TROUTMAN PEPPER LOCKE LLP

(57) ABSTRACT

A vehicle travel control device includes a surrounding environment recognition device and a travel control unit. The surrounding environment recognition device is configured to acquire surrounding environment information of a vehicle. The travel control unit is configured to perform travel control of the vehicle, based on the surrounding environment information acquired by the surrounding environment recognition device. The travel control unit is configured to, when the surrounding environment recognition device detects that a road surface state of a road surface in a traveling direction of the vehicle is likely to be a frozen road surface, automatically switch a traveling mode of the vehicle to a rough road traveling mode. The travel control unit is configured to, when the surrounding environment recognition device detects that the road surface state being in the frozen road surface is eliminated, automatically cancel the rough road traveling mode.

10 Claims, 2 Drawing Sheets

(56) References Cited

U.S. PATENT DOCUMENTS

2023/0140569 A1 * 5/2023 Foster ................. B60W 30/146
701/400

* cited by examiner

VEHICLE TRAVEL CONTROL DEVICE

CROSS-REFERENCE TO RELATED APPLICATION

The present application claims priority from Japanese Patent Application No. 2022-170780 filed on Oct. 25, 2022, the entire contents of which are hereby incorporated by reference.

BACKGROUND

The present disclosure relates to a vehicle travel control device that can perform continuously stable travel control even on a slippery road surface or the like, such as a frozen road surface.

In recent years, various vehicle travel control devices have been proposed and put into practical use in order to enable stable travel control when a vehicle or the like travels on a road or the like.

In a vehicle travel control device of the related art, for example, a vehicle travel state is detected by using various sensors, and various units in the vehicle are controlled based on the detection results. Examples of the control performed in this case include individual brake control of wheels (normally, four wheels), driving force control of a driving source (an engine, a driving motor, or the like), torque distribution control of the wheels (four wheels individually or front and rear wheels), and the like. By appropriately performing these various kinds of control, for example, travel control for suppressing unstable behavior or the like, such as skidding of a traveling vehicle, is performed.

In addition, for example, in winter or the like, in some cases, a road surface or the like on which the vehicle travels (hereafter, referred to as a road surface or the like) is entirely or partially slippery due to freezing or the like. As travel control for causing the vehicle to travel stably on such a frozen road surface or the like, various types of control described above are enhanced and executed. Such enhanced control is executed in a traveling mode called rough road traveling mode or the like, and the traveling mode is provided in various travel control devices that have been proposed.

However, in the travel control device of the related art, a driver who drives the vehicle determines the road surface state by visually recognizing the road surface state, and the driver performs a manual switching operation as appropriate to switch a traveling mode between a normal traveling mode, the rough road traveling mode, or the like.

In view of this, for example, a technique has been proposed in which a travel control device disclosed in Japanese Unexamined Patent Publication (JP-A) No. 2019-106159 or the like detects a road surface shape, based on camera image data, and automatically switches to a traveling mode corresponding to the detected road surface shape, based on the detection results.

SUMMARY

An aspect of the present disclosure provides a vehicle travel control device. The vehicle travel control device includes a surrounding environment recognition device and a travel control unit. The surrounding environment recognition device is configured to acquire surrounding environment information of a vehicle. The travel control unit is configured to perform travel control of the vehicle, based on the surrounding environment information acquired by the surrounding environment recognition device. The travel control unit is configured to, when the surrounding environment recognition device detects that a road surface state of a road surface in a traveling direction of the vehicle is likely to be a frozen road surface, automatically switch a traveling mode of the vehicle to a rough road traveling mode. The travel control unit is configured to, when the surrounding environment recognition device detects that the road surface state being in the frozen road surface is eliminated, automatically cancel the rough road traveling mode.

An aspect of the present disclosure provides a vehicle travel control device. The vehicle travel control device includes a surrounding environment recognition device and circuitry. The surrounding environment recognition device includes a sensor and is configured to acquire surrounding environment information of a vehicle. The circuitry is configured to perform travel control of the vehicle, based on the surrounding environment information acquired by the surrounding environment recognition device. The circuitry is configured to, when the surrounding environment recognition device detects that a road surface state of a road surface in a traveling direction of the vehicle is likely to be a frozen road surface, automatically switch a traveling mode of the vehicle to a rough road traveling mode. The circuitry is configured to, when the surrounding environment recognition device detects that the road surface state being the frozen road surface is eliminated, automatically cancel the rough road traveling mode.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Figure 1:
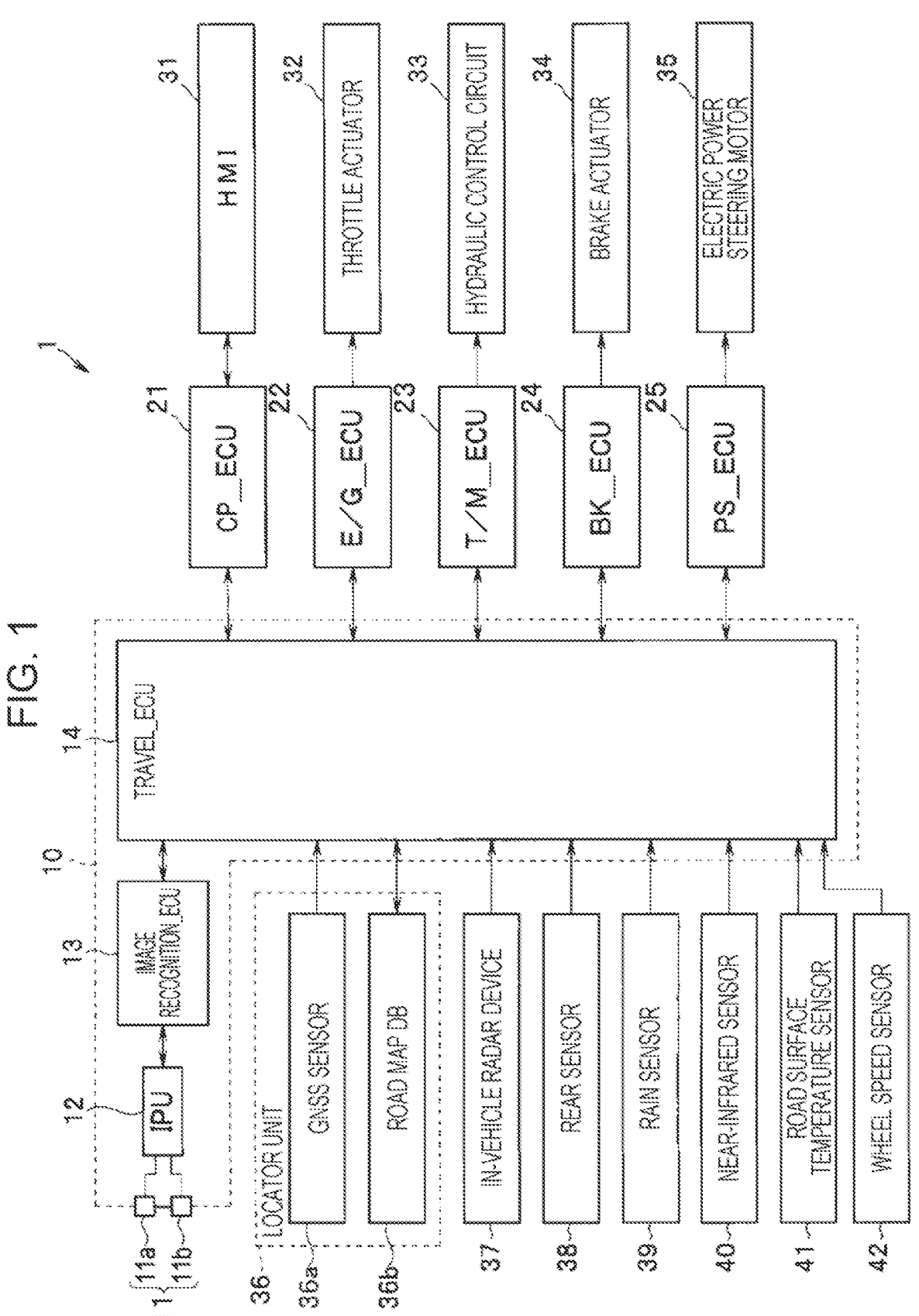
FIG. 1 is a block diagram illustrating a schematic configuration of a vehicle travel control device according to an embodiment of the present disclosure.

In the travel control device of the related art disclosed in JP-A No. 2019-106159 or the like, the road surface state is detected based on the camera image data. Therefore, in order to detect the accurate road surface state, it is expected to acquire a clear optical image. Therefore, there is a problem in that it is difficult to reliably detect the road surface state at all times, for example, at night, in a dark place, or in a place where a shadow or the like is present.

For example, it is well known that various forms of frozen states appear on a frozen road surface or the like which occurs in winter or the like. For example, various forms of frozen states are known, such as compacted snow icy road or black ice.

Of these, for example, a state called black ice refers to a state in which moisture on a wet road surface freezes due to a sudden drop in the air temperature at night or the like after a rainfall, and the road surface is coated with thin ice. It is well known that it is very difficult to reliably distinguish whether such black ice or the like has occurred from a camera image, human vision, or the like.

It is desirable to provide a vehicle travel control device that can perform continuously stable travel control even on a slippery road surface such as a frozen road surface.

The present disclosure will be described below with reference to the embodiment illustrated in the drawings. Each drawing used in the following description is schematically illustrated, and in order to illustrate each constituent element in a recognizable size on the drawing, a dimensional relationship, a scale, or the like of each member may be illustrated differently for each constituent element. Therefore, the present disclosure is not limited to the embodiment illustrated in the drawings with respect to the number of constituent elements, the shape of each constituent element, the size ratio of each constituent element, the relative positional relationship of each constituent element, and the like.

First, a schematic configuration of a vehicle travel control device according to an embodiment of the present disclosure will be described below with reference to FIG. 1. FIG. 1 is a block diagram illustrating the schematic configuration of the vehicle travel control device according to the embodiment of the present disclosure. The basic configuration of the travel control device according to the present embodiment is substantially the same as that of a travel control device of the same type of the related art. Therefore, the following description is limited to a schematic description of the vehicle travel control device according to the present embodiment.

A vehicle travel control device 1 according to the present embodiment includes a camera unit 10, which is an in-vehicle camera device fixed to a central portion of a front upper portion in a vehicle cabin of a vehicle (hereinafter, referred to as a host vehicle) on which the travel control device 1 is mounted.

The camera unit 10 includes a stereo camera assembly 11, an image processing unit (IPU) 12, an image recognition unit (image recognition electronic control unit, image recognition_ECU) 13, and a travel control unit (travel_ECU) 14.

The stereo camera assembly 11 includes a main camera 11a and a sub camera 11b. The main camera 11a and the sub camera 11b are disposed, for example, at bilaterally symmetrical positions with the center in a vehicle-width direction interposed therebetween in the vehicle cabin of the host vehicle so as to face forward (in the traveling direction). In addition, the main camera 11a and the sub camera 11b are constituted by, for example, a complementary metal-oxide-semiconductor (CMOS) image sensor or the like, and generate a stereo image by acquiring two images of a surrounding environment in a predetermined range in front of the vehicle from different viewpoints in predetermined imaging cycles synchronized with each other.

The IPU 12 performs predetermined image processing on surrounding environment image data (image data representing the surrounding environment of the traveling host vehicle) captured by the stereo camera assembly 11 to detect edges of various objects such as an object in the image and a marking line marked on a road surface (hereinafter, simply referred to as a marking line or the like). As a result, the IPU 12 recognizes a three-dimensional object, the marking line, or the like around the vehicle. Then, the IPU 12 acquires distance information from positional deviation amounts of the corresponding edges in the left and right images, and generates image information (distance image information) including the distance information.

Based on the distance image information or the like received from the IPU 12, the image recognition_ECU 13 obtains road curvatures [1/m] of the marking lines that demarcate the left and right of a traveling road (host vehicle traveling road) on which the host vehicle travels and the widths (lane widths) between the left and right marking lines. Various methods for obtaining the road curvature and the lane width are known. For example, the image recognition_ECU 13 recognizes the left and right marking lines by binarizing the road curvatures using a brightness difference based on surrounding environment information, and obtains the curvatures of the left and right marking lines for each predetermined section by a curve approximation formula by the least square method or the like. Furthermore, the image recognition_ECU 13 calculates the lane width from the difference between the curvatures of the left and right marking lines.

Then, based on the curvatures of the left and right marking lines and the lane width, the image recognition_ECU 13 calculates a lane center, a host vehicle lateral position deviation, which is the distance from the lane center to the center of the host vehicle in the vehicle width direction, and the like.

The image recognition_ECU 13 also performs predetermined pattern matching or the like on the distance image information to recognize three-dimensional objects such as guardrails extending along a road, curbs, and peripheral vehicles, and also recognize the state or the like of the road surface (hereinafter, referred to as a road surface state or the like). Here, in the recognition of the three-dimensional objects in the image recognition_ECU 13, for example, types of the three-dimensional objects, heights of the three-dimensional objects, distances to the three-dimensional objects, speeds of the three-dimensional objects, relative speeds between the three-dimensional objects and the host vehicle, relative distances between the three-dimensional objects (for example, lateral distances between curbs or the like at road edges and marking lines or the like near the curbs), and the like are recognized. As the road surface state or the like to be recognized, for example, a state in which the road surface is wet due to rain, snowmelt, or the like, a rainfall state, a snow accumulation state, a compacted snow state, a frozen state, or the like is assumed.

Various kinds of information recognized in the image recognition_ECU 13 are output to the travel_ECU 14 as first surrounding environment information.

In this way, in the present embodiment, the image recognition_ECU 13 has a function as a surrounding environment recognition device that recognizes a first surrounding environment around the vehicle together with the stereo camera assembly 11 and the IPU 12.

The travel_ECU 14 is a control unit for integrally controlling the travel control device 1. As various control units, a cockpit control unit (CP_ECU) 21, an engine control unit (E/G_ECU) 22, a transmission control unit (T/M_ECU) 23, a brake control unit (BK_ECU) 24, and a power steering control unit (PS_ECU) 25 are coupled to the travel_ECU 14 via an in-vehicle communication line such as a controller area network (CAN).

A human machine interface (HMI) 31 disposed around a driver's seat is coupled to the CP_ECU 21. The HMI 31 includes, for example, a switch for issuing an instruction for executing various kinds of driving support control, a mode change switch for switching a driving mode, and a steering touch sensor for detecting a steering state of the driver. The HMI 31 further includes, for example, a driver monitoring system (DMS) for the driver's face authentication, line of sight detection, or the like, a touch panel display device (visual display device), a combination meter, a sound generating device (auditory device) including a speaker, and the like.

Upon receiving a control signal from the travel_ECU 14, the CP_ECU 21 appropriately notifies the driver of various alarms for a preceding vehicle or the like, an execution status of the driving support control, various pieces of information on the surrounding environment of the host vehicle, and the like by display, sound, or the like through the HMI 31. In addition, the CP_ECU 21 outputs various kinds of input information such as an on/off operation state with respect to various kinds of driving support control input by the driver through the HMI 31 to the travel_ECU 14.

A throttle actuator 32 or the like of an electronic control throttle is coupled to the output side of the E/G_ECU 22. In addition, various sensors such as an accelerator sensor (not illustrated) are coupled to the input side of the E/G_ECU 22.

The E/G_ECU 22 controls the driving of the throttle actuator 32, based on the control signal from the travel_ECU 14 or detection signals from various sensors. As a result, the E/G_ECU 22 adjusts an intake air amount of an engine to generate a desired engine power. In addition, the E/G_ECU 22 outputs a signal such as an accelerator opening degree detected by various sensors to the travel_ECU 14.

A hydraulic control circuit 33 is coupled to the output side of the T/M_ECU 23. In addition, various sensors such as a shift position sensor (not illustrated) are coupled to the input side of the T/M_ECU 23. The T/M_ECU 23 performs hydraulic control on the hydraulic control circuit 33, based on an engine torque signal estimated by the E/G_ECU 22, the detection signals from various sensors, and the like. As a result, the T/M_ECU 23 operates frictional engagement elements, pulleys, and the like provided in an automatic transmission to change an engine output with a desired transmission gear ratio. In addition, the T/M_ECU 23 outputs signals of a shift position and the like detected by various sensors to the travel_ECU 14.

A brake actuator 34 for adjusting a brake fluid pressure to be output to a brake wheel cylinder provided in each wheel is coupled to the output side of the BK_ECU 24. In addition, various sensors (not illustrated) such as a brake pedal sensor, a yaw rate sensor, a longitudinal accelerator sensor, and a vehicle speed sensor are coupled to the input side of the BK_ECU 24.

The BK_ECU 24 performs drive control on the brake actuator 34, based on the control signal from the travel_ECU 14 or the detection signals from various sensors. As a result, the BK_ECU 24 causes the wheels to appropriately generate braking forces for performing forced brake control, yaw rate control, and the like on the host vehicle. In addition, the BK_ECU 24 outputs signals of a brake operation state, a yaw rate, a longitudinal acceleration, a vehicle speed (host vehicle speed), and the like detected by various sensors to the travel_ECU 14.

An electric power steering motor 35 for applying a steering torque to a steering mechanism by a rotational force of the motor is coupled to the output side of the PS_ECU 25. In addition, various sensors (not illustrated) such as a steering torque sensor and a steering angle sensor are coupled to the input side of the PS_ECU 25.

The PS_ECU 25 performs drive control on the electric power steering motor 35, based on the control signal from the travel_ECU 14 or the detection signals from various sensors. As a result, the PS_ECU 25 generates a steering torque for the steering mechanism. In addition, the PS_ECU 25 outputs signals of a steering torque, a steering angle, and the like detected by various sensors to the travel_ECU 14.

Furthermore, a locator unit 36, an in-vehicle radar device 37, a rear sensor 38, a rain sensor 39, a near-infrared sensor 40, a road surface temperature sensor 41, a wheel speed sensor 42, and the like are coupled to the travel_ECU 14 as various sensors.

The locator unit 36 includes a global navigation satellite system (GNSS) sensor 36a and a high-precision road map database (road map DB) 36b.

The GNSS sensor 36a measures the position (latitude, longitude, altitude, and the like) of the host vehicle by receiving position measurement signals transmitted from position measurement satellites.

The road map DB 36b is a large-capacity storage medium such as a hard disk drive (HDD) or a solid state drive (SSD), and stores high-precision road map information (dynamic map). The road map DB 36b includes lane width data, lane center position coordinate data, lane traveling azimuth angle data, speed limit, and the like as lane data to be used for automatic driving. The lane data is stored in each lane on the road map at intervals of several meters.

In addition, the locator unit 36 can acquire real-time surrounding environment information (for example, traffic jam information, weather information, and the like) at the position of the host vehicle measured by the GNSS sensor 36a through communication with an external system (not illustrated). In this case, the weather information includes, for example, rainfall information, snowfall information, snow accumulation information, air temperature and humidity information, and the like of an area including the position of the host vehicle.

The road map DB 36b holds information on various facilities, parking lots, and the like.

Based on a request signal from the travel_ECU 14, for example, the road map DB 36b outputs the road map information of a set range based on the host vehicle position measured by the GNSS sensor 36a to the travel_ECU 14 as third surrounding environment information. As described above, in the present embodiment, the road map DB 36b has a function as the surrounding environment recognition device that recognizes a third surrounding environment around the vehicle together with the GNSS sensor 36a.

The in-vehicle radar device 37 includes sensors, such as millimeter wave radars. Here, the millimeter wave radars receive and analyze reflected waves from objects with respect to output radio waves, thereby mainly detecting three-dimensional objects such as pedestrians and parallel running vehicles, as well as structures and the like (for example, three-dimensional objects such as curbs, guardrails, walls of buildings or the like, and plants) provided at road edges (for example, end portions on the road shoulder side). Furthermore, the millimeter wave radars also detect a three-dimensional obstacle or the like present on the road. In this case, the millimeter wave radars detect a lateral width of the three-dimensional object, a position of a representative point of the three-dimensional object (a relative position and a relative distance with respect to the host vehicle), a relative speed, and the like as specific information regarding the three-dimensional object.

Note that the sensors (the millimeter wave radars and the like) included in the in-vehicle radar device 37 are disposed, for example, on left and right side portions of a front bumper (referred to as front left and right side sensors), left and right side portions of a rear bumper (referred to as rear left and right side sensors), and the like. Then, the front left and right side sensors detect, as second surrounding environment information, three-dimensional objects present in areas diagonally in front of and on the left and right sides of the host vehicle, which are difficult to recognize in the image obtained by the stereo camera assembly 11. In addition, the rear left and right side sensors detect, as the second surrounding environment information, three-dimensional objects present in areas diagonally to the left and right sides and the rear of the host vehicle, which are difficult for the front left and right side sensors to recognize.

As described above, in the present embodiment, the in-vehicle radar device 37 has a function as the surrounding environment recognition device that recognizes a second surrounding environment around the vehicle. Then, the information acquired by each sensor of the in-vehicle radar device 37 is sent to the image recognition_ECU 13.

The rear sensor 38 is constituted by, for example, a sonar device. For example, at least one (or more than one) rear sensor 38 is disposed on the rear bumper. The rear sensor 38 detects, as fourth surrounding environment information, a three-dimensional object present in an area behind the host vehicle, which is difficult for the rear left and right side sensors to recognize. As described above, in the present embodiment, the rear sensor 38 has a function as the surrounding environment recognition device that recognizes a fourth surrounding environment around the vehicle.

Note that each of the first surrounding environment information recognized by the image recognition_ECU 13, the third surrounding environment information recognized by the locator unit 36, the second surrounding environment information recognized by the in-vehicle radar device 37, and the fourth surrounding environment information recognized by the rear sensor 38 includes the coordinates of each object outside the vehicle. The coordinates are all converted into the coordinates of the three-dimensional coordinate system having the center of the host vehicle as the origin in the travel_ECU 14.

The rain sensor 39 is a sensor that detects raindrops, snowfall, or the like adhering to a front window. The information acquired by the rain sensor 39 is output to the travel_ECU 14. Then, in the travel_ECU 14, a control signal corresponding to the rainfall/snowfall amount or the traveling speed is generated, and for example, drive control of a wiper device or the like is performed. At the same time, based on the information acquired by the rain sensor 39, the weather information (information such as rainfall/snowfall) around the host vehicle is recognized.

The near-infrared sensor 40 is a sensor that recognizes a surrounding situation of the host vehicle, for example, a road surface temperature or a road surface state such as a moisture amount. Based on the information acquired by the near-infrared sensor 40, the road surface temperature, the moisture amount on the road surface, a frozen state of the road surface, and the like are recognized.

The road surface temperature sensor 41 is a sensor that detects the road surface temperature of a predetermined area in the traveling direction (forward) area of the host vehicle.

Here, the detection area of the near-infrared sensor 40 and the road surface temperature sensor 41 may include, for example, at least an area through which a wheel is expected to pass. For example, in a situation in which snow starts to accumulate on a road surface in an initial stage of snowfall, there is a case in which, even when a road surface area through which a central portion of the vehicle is to pass is in a snow accumulation state, there is an icy road compacted by vehicles passing therethrough in a portion through which a wheel is to pass. In consideration of such a situation, for example, by limiting an area the temperature of which is detected by the road surface temperature sensor 41 mainly to an area through which a wheel is to pass, it is possible to more reliably detect a more slippery part of a frozen road surface or the like.

In addition, the area the temperature of which is detected by the road surface temperature sensor 41 may be a predetermined fixed area in the traveling direction (forward) of the vehicle (wheels), or the detection area may vary in conjunction with an steered angle.

Furthermore, road surface temperature sensors 41 may be provided corresponding to the areas through which the wheels (four wheels) are to pass, but at least one road surface temperature sensor 41 may be provided. Here, in a case where one road surface temperature sensor 41 is provided, for example, the road surface temperature sensor 41 may be provided at a position at which an area through which the front wheel on a side away from the position where the driver (user) is on board is to pass can be detected. For example, in the case of a vehicle in which a steering wheel is installed on the right side of the vehicle, the area through which the left front wheel is to pass may be set as the detection area. With this configuration, the road surface temperature sensor 41 can quickly and accurately detect a frozen part at a position at which it is difficult for the driver (user) to recognize the wheel position.

The information acquired by the sensors such as the rain sensor 39, the near-infrared sensor 40, and the road surface temperature sensor 41 is detected as fifth surrounding environment information. In the present embodiment, the sensors such as the rain sensor 39, the near-infrared sensor 40, and the road surface temperature sensor 41 function as the surrounding environment recognition device that recognizes a fifth surrounding environment around the vehicle.

The wheel speed sensor 42 is a sensor that detects the wheel speed of each of wheels (normally, four wheels) of the host vehicle. The wheel speed sensor 42 detects the traveling speed of the host vehicle by detecting, for example, the rotational speed of each wheel. The wheel speed sensor 42 individually detects, for example, a locked state, a slip state, or the like of each wheel. Here, the wheel speed sensor 42 functions as a vehicle state recognition device that acquires state information of the host vehicle.

The travel_ECU 14 executes travel control for stable traveling of the vehicle, based on the information acquired by various sensors. For example, when a rotation difference between the wheels is detected based on output information of the wheel speed sensor 42 and the rotation difference occurs between the wheels, the E/G_ECU 22 performs engine power control and torque distribution control of the drive wheels, and also, the BK_ECU 24 executes individual brake control of the wheels to suppress unstable traveling of the vehicle.

Here, for example, control when the individual brake control by the BK_ECU 24 intervenes in a case where the rotation difference occurs between the wheels is referred to as brake limited slip differential (LSD) control. Since the brake LSD control itself is a well-known technique, a detailed description thereof will be omitted.

In the vehicle travel control device 1 according to the present embodiment, the brake LSD control is configured to be able to set operation modes in which a brake boosting speed or a brake pressure reduction timing is different when the individual brake control intervenes in each wheel.

Examples include the brake LSD control at the time of a normal traveling mode, the brake LSD control at the time of a rough road traveling mode in which enhanced control is performed as compared with the brake LSD control at the time of the normal traveling mode, and the like.

In the brake LSD control at the time of the rough road traveling mode, for example, the brake boosting speed when the rotation difference occurs between the wheels is controlled to be higher than the brake boosting speed in the normal traveling mode. In addition, the brake pressure reduction timing when the rotation difference occurs between the wheels is controlled to be delayed with respect to the brake pressure reduction timing in the normal traveling mode. By performing the different brake LSD control processes in the above manner, the driving force during traveling on a more slippery road surface is further increased to implement stable traveling.

All or some of the locator unit 36, the image recognition_ECU 13, the travel_ECU 14, the CP_ECU 21, the E/G_ECU 22, the T/M_ECU 23, the BK_ECU 24, the PS_ECU 25, and the like are configured by a processor including hardware.

Here, the processor includes, for example, a known configuration including a central processing unit (CPU), a random access memory (RAM), a read only memory (ROM), a non-volatile memory, a non-volatile storage, a non-transitory computer readable medium, and the like, and peripheral devices thereof.

A software program to be executed by the CPU, fixed data such as a data table, and the like are stored in advance in the ROM, the non-volatile memory, the non-volatile storage, and the like. Then, the CPU reads the software program stored in the ROM or the like, loads the software program to the RAM, and executes the software program. In addition, the software program appropriately refers to various kinds of data or the like, and thereby, each function of each of the above-described constituent parts, the constituent units (13, 14, 21 to 25, and 36), and the like is implemented.

In addition, the processor may be configured by a semiconductor chip such as a field programmable gate array (FPGA). Furthermore, each of the above-described constituent parts, the constituent units (13, 14, 21 to 25, and 36), and the like may be configured by an electronic circuit.

Furthermore, the software program may be entirely or partially recorded as a computer program product in a portable template medium such as a flexible disk, a compact disc read only memory (CD-ROM), or a digital versatile disc read only memory (DVD-ROM), a non-transitory computer readable medium such as a card memory, a hard disk drive (HDD) device, or a solid state drive (SSD) device, or the like.

The operation of the vehicle travel control device according to the present embodiment configured as described above will be described below with reference to the flowchart in FIG. 2.

Figure 2:
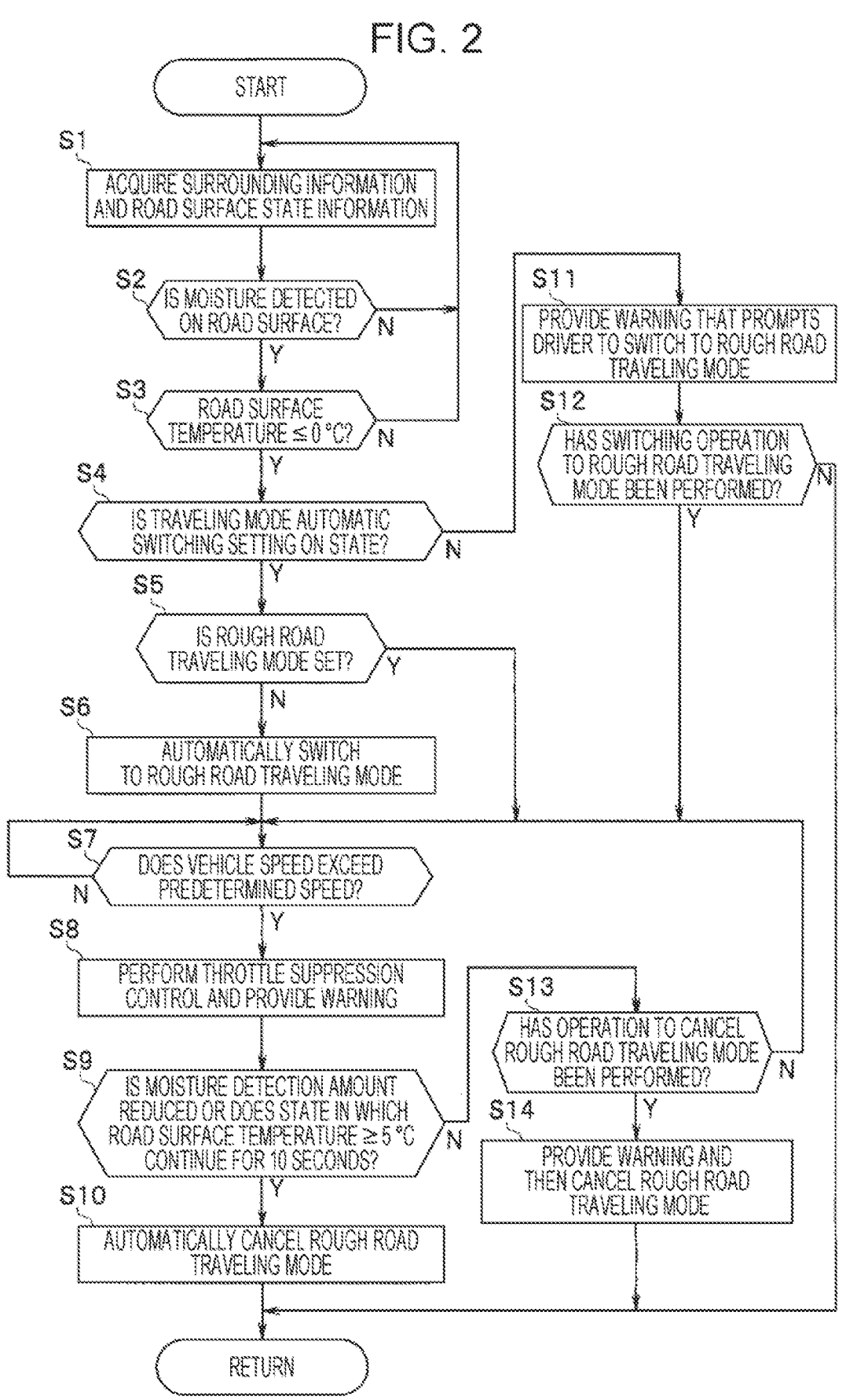
FIG. 2 is a flowchart illustrating an operation of the vehicle travel control device according to the embodiment of the present disclosure.

The control process illustrated in FIG. 2 is a control process executed if it is determined that, while the host vehicle is traveling on a road or the like, the road surface state detected based on the output results of, for example, the near-infrared sensor 40, the road surface temperature sensor 41, and the like among various sensors is a slippery road surface state such as a frozen road surface.

It is assumed that the host vehicle on which the vehicle travel control device 1 according to the present embodiment is mounted is traveling on a road or the like. At this time, in step S1 in FIG. 2, the travel_ECU 14 continuously acquires information on the surrounding environment of the host vehicle (surrounding information) and information on the road surface state, based on various kinds of information acquired by various sensors such as the stereo camera assembly 11, the locator unit 36, the rain sensor 39, the near-infrared sensor 40, and the road surface temperature sensor 41. It is assumed that the surrounding information acquisition process is continuously executed while the host vehicle is traveling.

In step S2, the travel_ECU 14 determines whether moisture is detected on the road surface, based on the information acquired in step S1 above. If moisture is detected on the road surface, the process proceeds to the subsequent step S3. In addition, if moisture is not detected on the road surface, the process returns to step S1 above, and the surrounding environment information acquisition process is continued.

Subsequently, in step S3, the travel_ECU 14 determines whether the road surface temperature is less than or equal to zero degrees Celsius (° C.), based on the information acquired in step S1 above. Here, if it is determined that the road surface temperature is less than or equal to zero degrees Celsius (° C.), it is determined that the road surface is likely to be a frozen road surface or the like, and the process proceeds to the subsequent step S4. In addition, if it is determined that the road surface temperature exceeds zero degrees Celsius (° C.), the process returns to step S1 above, and the surrounding environment information acquisition process is continued.

In step S4, the travel_ECU 14 determines whether "traveling mode automatic switching setting" is in the ON state among current settings of the host vehicle. Here, the "traveling mode automatic switching setting" is a setting item of an operation mode in which a traveling mode corresponding to a surrounding situation is automatically switched from among various traveling modes prepared in advance when the host vehicle travels on a road. The driver (user) can selectively set the ON state or the OFF state of the traveling mode automatic switching setting.

The various traveling modes include, for example, the rough road traveling mode or the like in addition to the normal traveling mode. The rough road traveling mode is a traveling mode selected when the vehicle travels on a road of a poor road surface state (for example, a road that is expected to be slippery, such as a frozen road surface).

Various kinds of control performed when the rough road traveling mode is set include, for example, drive control of the throttle actuator 32 by the E/G_ECU 22, hydraulic control of the hydraulic control circuit 33 by the T/M_ECU 23, and drive control of the brake actuator 34 by the BK_ECU 24.

For example, by the drive control of the throttle actuator 32 by the E/G_ECU 22, control for suppressing a rapid torque change to suppress skidding or control for obtaining a large driving force early to enhance a rough road traveling performance is performed. In addition, upon a slip of a drive wheel, torque down control or the like for reducing the engine output is also performed.

In addition, by the hydraulic control of the hydraulic control circuit 33 by the T/M_ECU 23, the generation of rotation difference between the front and rear wheels is suppressed to enhance a traction performance, the transmission gear ratio is set lower than that at the time of normal control, and a lock-up region is exclusively set to perform stable traveling control on a rough road.

By the drive control of the brake actuator 34 by the BK_ECU 24, the brake LSD control for suppressing the rotation difference between the left and right wheels is performed.

These kinds of control in the rough road traveling mode are executed when the vehicle speed is less than or equal to a predetermined speed (for example, about 40 kilometers per hour (km/h)), and the rough road traveling mode is canceled when the vehicle speed exceeds the predetermined speed.

In the present embodiment, in the process in steps S2 and S3 above, it is determined whether the road surface state while the host vehicle is traveling is the slippery road surface state such as the frozen road surface. Therefore, it is assumed that the traveling mode automatically set in step S4 is switched to the rough road traveling mode, which is a traveling mode suitable for the slippery road surface state such as the frozen road surface.

If it is determined in step S4 that the "traveling mode automatic switching setting" is in the ON state, the process proceeds to the subsequent step S5. In addition, if it is determined that the "traveling mode automatic switching setting" is in the OFF state, the process proceeds to step S11.

In step S5, the travel_ECU 14 determines whether the rough road traveling mode is already set. If the rough road traveling mode is already set, the process proceeds to step S7. In addition, if the rough road traveling mode is not set, the process proceeds to the subsequent step S6.

In step S6, the travel_ECU 14 performs an automatic switching process for switching to the rough road traveling mode. Subsequently, the process proceeds to step S7.

On the other hand, in a case where the "traveling mode automatic switching setting" is in the OFF state in step S4 above, if the process proceeds to step S11, in step S11, the travel_ECU 14 provides a warning for prompting the driver (user) to, for example, switch to the rough road traveling mode. This warning can be provided as, for example, a visual indication using a visual indication device such as a display device included in the HMI 31, or an auditory indication using an auditory indication device such as a sound generating device including a speaker included in the HMI 31.

Subsequently, the process proceeds to step S12, and in step S12, the travel_ECU 14 determines whether a switching operation to the rough road traveling mode has been performed, that is, whether the rough road traveling mode is set. Here, if it is determined that the switching operation to the rough road traveling mode has been performed, that is, if it is determined that the rough road traveling mode is set, the process proceeds to step S7. In addition, if it is determined that the switching operation to the rough road traveling mode has not been performed, the series of steps end (return).

In the rough road traveling mode applied when the vehicle travels on a road in the slippery road surface state such as the frozen road surface, in some cases, an operation upper limit value is set for the vehicle speed. For example, in the travel control device 1 according to the present embodiment, as described above, when the vehicle speed exceeds the predetermined speed (for example, an upper limit value of 40 kilometers per hour (km/h)), the set rough road traveling mode is temporarily canceled.

After the rough road traveling mode is canceled due to the vehicle speed exceeding 40 kilometers per hour (km/h) in the above manner, while the vehicle continues to travel, if the vehicle speed decreases and falls below, for example, a predetermined speed (for example, 35 kilometers per hour (km/h)), control for returning to the rough road traveling mode again is performed.

In this way, in a case of controlling cancellation and resetting (returning) of the rough road traveling mode in accordance with the predetermined vehicle speeds, for example, the following problem may occur.

First, it is assumed that the vehicle is traveling on a road in the slippery road surface state such as the frozen road surface in a state in which the driver (user) manually sets the rough road traveling mode. When the driver (user) performs an accelerator operation to increase the vehicle speed during the traveling, and as a result, the vehicle speed exceeds the predetermined vehicle speed, the rough road traveling mode is temporarily canceled.

In this case, the vehicle continues to travel on the road in the slippery road surface state such as the frozen road surface at a high vehicle speed greater than or equal to the predetermined speed. Therefore, it is desirable to avoid such a situation as much as possible.

Therefore, in the travel control device 1 according to the present embodiment, while the detection of the slippery road surface state such as the frozen road surface continues, even if the driver (user) inadvertently performs the accelerator operation (accelerator depression operation), control intervenes for suppressing the driving force in accordance with the accelerator operation. As a result, an increase in the vehicle speed in accordance with the accelerator operation is suppressed, and the travel control in which the vehicle speed does not exceed the predetermined upper limit speed value is continuously performed.

Therefore, in this case, the rough road traveling mode is not canceled.

Therefore, in step S7 in FIG. 2, the travel_ECU 14 determines whether the current vehicle speed exceeds the predetermined speed (for example, 40 kilometers per hour (km/h)). Here, if it is determined that the current vehicle speed exceeds the predetermined speed (for example, 40 kilometers per hour (km/h)), the process proceeds to the subsequent step S8. In addition, if the current vehicle speed does not exceed the predetermined speed (for example, 40 kilometers per hour (km/h)), the same processing is repeated.

In step S8, the travel_ECU 14 performs speed suppression control by controlling the throttle actuator 32 by the E/G_ECU 22, and concurrently provides a predetermined warning. The provided warning is, for example, a warning indicating that it is dangerous to increase the speed because there is a possibility that the road surface is frozen. In addition, the warning may notify the driver (user), for example, that control for suppressing the vehicle speed is being executed for the above reason, that the rough road traveling mode being set can be canceled by a manual operation, or the like. This warning is provided, for example, as a visual indication using a display device or the like (visual indication device), or an auditory indication using a sound generating device or the like (auditory indication device) including a speaker or the like.

Subsequently, in step S9, the travel_ECU 14 determines a detection value of a moisture detection amount on the road surface or the road surface temperature, based on the information obtained by the surrounding information acquisition process (step S1). Here, it is determined whether one or more of a state in which the moisture detection amount on the road surface is less than or equal to a predetermined threshold value and a state in which the road surface temperature is greater than or equal to a predetermined threshold value (for example, 5 degrees Celsius (° C.)) continue for a predetermined time (for example, 10 seconds) or more. Here, if it is determined that the above-described state (the state in which the moisture detection amount is less than or equal to the predetermined value or the state in which the road surface temperature is greater than or equal to the predetermined value) continues for the predetermined time or more, it is determined that the frozen state of the road surface is eliminated, and the process proceeds to the subsequent step S10.

Subsequently, in step S10, the travel_ECU 14 automatically cancels the rough road traveling mode. Subsequently, the series of steps end (return).

On the other hand, if it is not determined in step S9 above that the above-described state (the state in which the moisture detection amount is less than or equal to the predetermined value or the state in which the road surface temperature is greater than or equal to the predetermined value) continues for the predetermined time or more, the process proceeds to step S13.

In step S13, the travel_ECU 14 determines whether the driver (user) has manually performed an operation to cancel the rough road traveling mode. Here, if it is determined that the driver (user) has performed the operation to cancel the rough road traveling mode, the process proceeds to the subsequent step S14. In addition, if it is determined that the driver (user) has not performed the operation to cancel the rough road traveling mode, the process returns to step S7.

In step S14, the travel_ECU 14 provides a predetermined warning and then cancels the rough road traveling mode. Subsequently, the series of steps end (return). Note that the warning provided in the above-described process is, for example, a warning indicating that it is dangerous to travel with the rough road traveling mode canceled because there is a possibility that the road surface is frozen. This warning is provided, for example, as a visual indication using a display device or the like (visual indication device), or an auditory indication using a sound generating device or the like (auditory indication device) including a speaker or the like. Subsequently, the series of steps end (return).

As described above, according to the first embodiment above, the road surface state is detected based on the information acquired by the near-infrared sensor 40 and the road surface temperature sensor 41 as the surrounding environment recognition device. Therefore, for example, it is possible to reliably detect the road surface state that is difficult to recognize by using a camera image or the like (that is, a state in which there is a high possibility of a slippery road surface state such as a frozen road surface).

In addition, the control for automatically switching the traveling mode in accordance with the detected road surface state is performed. That is, if the road surface is likely to be in a frozen state, the control for automatically switching to the rough road traveling mode is performed. On the other hand, if it is determined that the frozen state of the road surface is eliminated, the setting of the rough road traveling mode is automatically canceled. In this way, by performing the control for automatically switching the traveling mode in accordance with the surrounding environment, reliable and stable travel control can be implemented in accordance with the surrounding environment.

In addition, since the traveling mode is automatically switched without depending on the determination of the driver (user), the burden on the driver (user) can be reduced. Therefore, the driver (user) can concentrate on a driving operation.

In the example of the present embodiment, the rough road traveling mode, which is the traveling mode corresponding to the frozen road surface or the like, is used as one of the traveling modes to be automatically switched. Since the operation upper limit speed is set in the rough road traveling mode, the control for canceling the setting of the rough road traveling mode is performed if the speed exceeds the predetermined speed.

In view of this, in the travel control device 1 according to the present embodiment, when the vehicle is traveling in a state in which the rough road traveling mode is set, even if the driver (user) inadvertently performs the accelerator depression operation, the speed suppression control for suppressing an increase in the vehicle speed is performed. Thus, since the vehicle speed does not exceed the predetermined upper limit speed while the rough road traveling mode is set, the rough road traveling mode is not temporarily canceled, and continuously stable and safe travel control can be continued.

In addition, if the driver (user) intentionally performs an operation to cancel the setting of the rough road traveling mode, the driver (user) is alerted by the predetermined warning provided while allowing the canceling operation. Therefore, the driver (user) can set the traveling mode without relying on his/her own determination alone, and thus can contribute to safety driving.

Furthermore, by limiting the detection area of the near-infrared sensor 40 or the road surface temperature sensor 41 as the surrounding environment recognition device to an area including at least an area through which a wheel is to pass, it is possible to more reliably detect the road surface frozen state.

In the above-described embodiment, an example in which the present disclosure is applied to the travel control device in the vehicle having an engine as the driving source has been described, but the present disclosure is not limited to such an embodiment. For example, the present disclosure can be similarly applied to a travel control device of a vehicle using an electric motor as the driving source, and in this case, the same effects can be obtained.

The present disclosure is not limited to the above-described embodiment, and various modifications and applications can be made without departing from the scope of the disclosure. Furthermore, the above-described embodiment includes disclosures at various stages, and various disclosures can be extracted by appropriately combining disclosed constituent features. For example, even if some constituent features are deleted from all the constituent features illustrated in the above embodiment, the problem to be solved by the disclosure can be solved and the effects of the disclosure can be obtained, the configuration from which these constituent features are deleted can be extracted as a disclosure. Furthermore, constituent elements of different embodiments may be combined as appropriate. This disclosure is not constrained by the specific embodiments thereof except as limited by the appended claims.

According to the present disclosure, it is possible to provide a vehicle travel control device that can perform continuously stable travel control even on a slippery road surface such as a frozen road surface.

The travel_ECU 14 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the travel_ECU 14. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle travel control device comprising:

a surrounding environment recognition device configured to acquire surrounding environment information of a vehicle, the surrounding environment recognition device comprising one or more sensors configured to detect an area in a road surface through which at least one of wheels of the vehicle is to pass;

one or more processors; and one or more memories storing instructions causing the one or more processors to perform travel control of the vehicle, based on the surrounding environment information acquired by the surrounding environment recognition device, wherein the one or more processors are caused to:

determine that a road surface state of the area in the road surface in a traveling direction of the vehicle is a frozen road surface based on a detection of moisture and a detection of road surface temperature, in response to determining that the road surface state of the area in the road surface in the traveling direction of the vehicle is the frozen road surface, automatically switch a traveling mode of the vehicle to a rough road traveling mode, determine that the road surface state being the frozen road surface is eliminated based on at least one of:

a detection that moisture amount on the road surface is less than or equal to a predetermined moisture value for a predetermined time or more; or a detection that the road surface temperature is greater than or equal to a predetermined temperature value for the predetermined time or more, and in response to determining that the road surface state being the frozen road surface is eliminated, automatically cancel the rough road traveling mode.

2. The vehicle travel control device according to claim 1, wherein the one or more processors are caused to, when the rough road traveling mode is set, perform speed suppression control for limiting a speed of the vehicle so as not to become greater than or equal to a predetermined speed.

3. The vehicle travel control device according to claim 1, wherein the one or more processors are caused to, when the rough road traveling mode is canceled, provide a predetermined warning.

4. The vehicle travel control device according to claim 1, wherein the one or more sensors comprise:

a near-infrared sensor configured to detect the moisture amount of the road surface in the traveling direction of the vehicle; and a road surface temperature sensor configured to detect the road surface temperature of the road surface in the traveling direction of the vehicle.

5. A vehicle travel control device comprising:

a surrounding environment recognition device including one or more sensors and configured to acquire surrounding environment information of a vehicle, the one or more sensors being configured to detect an area in a road surface through which at least one of wheels of the vehicle is to pass; and circuitry configured to perform travel control of the vehicle, based on the surrounding environment information acquired by the surrounding environment recognition device, wherein the circuitry is configured to:

determine that a road surface state of the area in the road surface in a traveling direction of the vehicle is a frozen road surface based on a detection of moisture and a detection of road surface temperature, in response to determining that the road surface state of the area in the road surface in the traveling direction of the vehicle is the frozen road surface, automatically switch a traveling mode of the vehicle to a rough road traveling mode, determine that the road surface state being the frozen road surface is eliminated based on at least one of:

a detection that moisture amount on the road surface is less than or equal to a predetermined moisture value for a predetermined time or more; or a detection that the road surface temperature is greater than or equal to a predetermined temperature value for the predetermined time or more, and in response to determining that the road surface state being the frozen road surface is eliminated, automatically cancel the rough road traveling mode.

6. The vehicle travel control device according to claim 1, wherein the one or more processors are caused to, determine the road surface state being the frozen road surface is eliminated, in response to:

(i) the moisture amount on the road surface is less than or equal to a predetermined moisture value for the predetermined time or more; and (ii) the road surface temperature is greater than or equal to a predetermined temperature value for the predetermined time or more.

7. The vehicle travel control device according to claim 5, wherein the circuitry is configured to, when the rough road traveling mode is set, perform speed suppression control for limiting a speed of the vehicle so as not to become greater than or equal to a predetermined speed.

8. The vehicle travel control device according to claim 5, wherein the circuitry is configured to, when the rough road traveling mode is canceled, provide a predetermined warning.

9. The vehicle travel control device according to claim 5, wherein the one or more sensors comprise:

a near-infrared sensor configured to detect the moisture amount of the road surface in the traveling direction of the vehicle; and a road surface temperature sensor configured to detect the road surface temperature of the road surface in the traveling direction of the vehicle.

10. The vehicle travel control device according to claim 5, wherein the circuitry is configured to, determine the road surface state being the frozen road surface is eliminated, in response to:

(i) the moisture amount on the road surface is less than or equal to a predetermined moisture value for the predetermined time or more; and (ii) the road surface temperature is greater than or equal to a predetermined temperature value for the predetermined time or more.

* * * * *